(12) United States Patent  
Bassett

(10) Patent No.: US 8,636,077 B2
(45) Date of Patent: Jan. 28, 2014

(54) AGRICULTURAL TOOL WITH STRUCTURAL HOUSING FOR HYDRAULIC ACTUATOR

(75) Inventor: Joseph D. Bassett, Sycamore, IL (US)

(73) Assignee: Dawn Equipment Company, Sycamore, IL (US)

( * ) Notice: Subject to any disclaimer, the term of this patent is extended or adjusted under 35 U.S.C. 154(b) by 0 days.

(21) Appl. No.: 13/477,280

(22) Filed: May 22, 2012

(65) Prior Publication Data

US 2013/0312988 A1 Nov. 28, 2013

(51) Int. Cl.
*A01B 5/00* (2006.01)
*A01B 49/02* (2006.01)

(52) U.S. Cl.
USPC .............................. 172/195; 172/551; 111/63

(58) Field of Classification Search
USPC ............... 111/63, 66, 140, 143, 167, 139, 14, 111/157, 163, 168, 52, 59, 62, 65; 172/551, 172/624.5, 705, 195
See application file for complete search history.

(56) References Cited

U.S. PATENT DOCUMENTS

| | | |
|---|---|---|
| 114,002 A | 4/1871 | Godfrey |
| 353,491 A | 2/1886 | Wells |
| 523,508 A | 7/1894 | Bauer et al. |
| 736,369 A | 8/1903 | Dynes et al. |
| 803,088 A | 10/1905 | Barker |
| 1,134,462 A | 4/1915 | Kendrick |
| 1,158,023 A | 10/1915 | Beaver |
| 1,247,744 A | 11/1917 | Trimble |
| 1,260,752 A | 3/1918 | Casaday |
| 1,321,040 A | 11/1919 | Hoffman |
| 1,391,593 A | 9/1921 | Sweeting |
| 1,398,668 A | 11/1921 | Bordsen |
| 1,481,981 A | 1/1924 | Boye |
| 1,791,462 A | 2/1931 | Bermel |
| 1,901,299 A | 3/1933 | Johnson |
| 1,901,778 A | 3/1933 | Schlag |
| 2,014,334 A | 9/1935 | Johnson |
| 2,058,539 A | 10/1936 | Welty et al. |
| 2,269,051 A | 1/1942 | Cahoy |
| 2,341,143 A | 2/1944 | Herr |
| 2,505,276 A | 4/1950 | Boroski |

(Continued)

FOREIGN PATENT DOCUMENTS

| | | |
|---|---|---|
| BE | 551372 | 10/1956 |
| CA | 530673 | 9/1956 |

(Continued)

OTHER PUBLICATIONS

Case Corporation Brochure, Planters 900 Series Units/Modules Product Information, Aug. 1986 (4 pages).

(Continued)

*Primary Examiner* — Árpád Fábián-Kovács
(74) *Attorney, Agent, or Firm* — Nixon Peabody LLP

(57) ABSTRACT

An agricultural row unit having a support frame, a structural support housing coupled to the support frame, and a swing arm having a leading end pivotably coupled to the structural support housing. An agricultural tool is coupled to a trailing end of the swing arm, and a hydraulic actuator is mounted to and fully enclosed within the structural support housing. The hydraulic actuator adjustably urges the agricultural tool downwardly toward a soil surface such that vertical pivoting movement is permitted in response to terrain changes in the soil surface.

20 Claims, 6 Drawing Sheets

(56) References Cited

U.S. PATENT DOCUMENTS

| | | |
|---|---|---|
| 2,561,763 A | 7/1951 | Waters et al. |
| 2,593,176 A | 4/1952 | Patterson |
| 2,611,306 A | 9/1952 | Strehlow et al. |
| 2,612,827 A | 10/1952 | Baggette et al. |
| 2,691,353 A | 10/1954 | Secondo |
| 2,692,544 A | 10/1954 | Jessup |
| 2,715,286 A | 8/1955 | Saveson |
| 2,754,622 A | 7/1956 | Rohnert |
| 2,771,044 A | 11/1956 | Putifer |
| 2,773,343 A | 12/1956 | Oppel |
| 2,777,373 A | 1/1957 | Pursche |
| 2,799,234 A | 7/1957 | Chancey |
| 2,805,574 A | 9/1957 | Jackson, Jr. et al. |
| 2,925,872 A | 2/1960 | Darnell |
| 2,960,358 A | 11/1960 | Christison |
| 3,010,744 A | 11/1961 | Hollis |
| 3,014,547 A | 12/1961 | Van der Lely |
| 3,038,424 A | 6/1962 | Johnson |
| 3,042,121 A | 7/1962 | Broetzman et al. |
| 3,057,092 A | 10/1962 | Curlett |
| 3,058,243 A | 10/1962 | McGee |
| 3,065,879 A | 11/1962 | Jennings et al. |
| 3,110,973 A | 11/1963 | Reynolds |
| 3,122,901 A | 3/1964 | Thompson |
| 3,123,152 A | 3/1964 | Biskis |
| 3,188,989 A | 6/1965 | Johnston |
| 3,213,514 A | 10/1965 | Evans |
| 3,250,109 A | 5/1966 | Spyridakis |
| 3,314,278 A | 4/1967 | Bergman |
| 3,319,589 A | 5/1967 | Moran |
| 3,351,139 A | 11/1967 | Schmitz et al. |
| 3,355,930 A | 12/1967 | Fedorov |
| 3,370,450 A | 2/1968 | Scheucher |
| 3,420,273 A | 1/1969 | Greer |
| 3,447,495 A | 6/1969 | Miller et al. |
| 3,539,020 A | 11/1970 | Andersson et al. ............. 74/527 |
| 3,543,603 A | 12/1970 | Gley ................................ 74/529 |
| 3,561,541 A | 2/1971 | Woelfel ........................ 172/265 |
| 3,576,098 A | 4/1971 | Brewer ........................... 56/295 |
| 3,581,685 A | 6/1971 | Taylor ............................... 111/7 |
| 3,593,720 A | 7/1971 | Botterill et al. ................. 130/27 |
| 3,606,745 A | 9/1971 | Girodat ............................ 56/20 |
| 3,635,495 A | 1/1972 | Orendorff ..................... 280/415 |
| 3,653,446 A | 4/1972 | Kalmon ............................ 172/4 |
| 3,701,327 A | 10/1972 | Krumholz ..................... 111/81 |
| 3,708,019 A | 1/1973 | Ryan ............................. 172/470 |
| 3,711,974 A | 1/1973 | Webb ................................ 40/63 |
| 3,718,191 A | 2/1973 | Williams ..................... 172/196 |
| 3,749,035 A | 7/1973 | Cayton et al. ................... 111/85 |
| 3,753,341 A | 8/1973 | Berg, Jr. et al. ............. 56/400.04 |
| 3,766,988 A | 10/1973 | Whitesides ................... 172/548 |
| 3,774,446 A | 11/1973 | Diehl ............................... 73/194 |
| 3,906,814 A | 9/1975 | Magnussen ............... 74/483 PB |
| 3,939,846 A | 2/1976 | Drozhzhin et al. ............. 130/27 |
| 3,945,532 A | 3/1976 | Marks ............................. 222/55 |
| 3,975,890 A | 8/1976 | Rodger ........................... 56/208 |
| 4,009,668 A | 3/1977 | Brass et al. ..................... 111/85 |
| 4,018,101 A | 4/1977 | Mihalic ........................... 74/493 |
| 4,044,697 A | 8/1977 | Swanson ......................... 111/66 |
| 4,055,126 A | 10/1977 | Brown et al. ................... 111/85 |
| 4,058,171 A | 11/1977 | van der Lely ................. 172/713 |
| 4,063,597 A | 12/1977 | Day ................................ 172/126 |
| 4,096,730 A | 6/1978 | Martin ............................ 72/352 |
| 4,099,576 A | 7/1978 | Jilani ............................. 172/555 |
| 4,122,715 A | 10/1978 | Yokoyama et al. ............. 73/228 |
| 4,129,082 A | 12/1978 | Betulius ............................ 111/7 |
| 4,141,200 A | 2/1979 | Johnson ........................ 56/10.2 |
| 4,141,421 A | 2/1979 | Morrison, Jr. et al. .......... 111/52 |
| 4,141,676 A | 2/1979 | Jannen et al. ................. 417/539 |
| 4,142,589 A | 3/1979 | Schlagenhauf .............. 172/510 |
| 4,147,305 A | 4/1979 | Hunt ............................. 239/167 |
| 4,149,475 A | 4/1979 | Bailey et al. .................... 111/66 |
| 4,157,661 A | 6/1979 | Schindel ........................ 73/228 |
| 4,161,090 A | 7/1979 | Watts, Jr. ....................... 52/301 |
| 4,173,259 A | 11/1979 | Heckenkamp ............... 172/10 |
| 4,182,099 A | 1/1980 | Davis et al. .................... 56/16.4 |
| 4,187,916 A | 2/1980 | Harden et al. ................ 172/146 |
| 4,191,262 A | 3/1980 | Sylvester ...................... 172/459 |
| 4,196,567 A | 4/1980 | Davis et al. .................... 56/13.7 |
| 4,196,917 A | 4/1980 | Oakes et al. .................. 280/463 |
| 4,206,817 A | 6/1980 | Bowerman .................... 172/559 |
| 4,208,974 A | 6/1980 | Dreyer et al. ................... 111/85 |
| 4,213,408 A | 7/1980 | West et al. ...................... 111/85 |
| 4,225,191 A | 9/1980 | Knoski ............................. 301/9 |
| 4,233,803 A | 11/1980 | Davis et al. ................... 56/14.9 |
| 4,241,674 A | 12/1980 | Mellinger ...................... 111/52 |
| 4,280,419 A | 7/1981 | Fischer ........................... 111/80 |
| 4,295,532 A | 10/1981 | Williams et al. ............. 172/184 |
| 4,301,870 A | 11/1981 | Carre et al. ...................... 172/7 |
| 4,307,674 A | 12/1981 | Jennings et al. ............... 111/85 |
| 4,311,104 A | 1/1982 | Steilen et al. ................... 111/85 |
| 4,317,355 A | 3/1982 | Hatsuno et al. ................ 72/342 |
| 4,359,101 A | 11/1982 | Gagnon .......................... 172/38 |
| 4,375,837 A | 3/1983 | van der Lely et al. .......... 172/68 |
| 4,377,979 A | 3/1983 | Peterson et al. ................ 111/52 |
| 4,407,371 A | 10/1983 | Hohl ............................ 172/253 |
| 4,430,952 A | 2/1984 | Murray .......................... 111/85 |
| 4,433,568 A | 2/1984 | Kondo ............................ 72/356 |
| 4,438,710 A | 3/1984 | Paladino ......................... 111/3 |
| 4,445,445 A | 5/1984 | Sterrett .............................. 111/7 |
| 4,461,355 A | 7/1984 | Peterson et al. ............. 172/156 |
| 4,481,830 A | 11/1984 | Smith et al. ............... 73/861.71 |
| 4,499,775 A | 2/1985 | Lasoen ...................... 73/862.57 |
| 4,506,610 A | 3/1985 | Neal ............................... 111/87 |
| 4,508,178 A | 4/1985 | Cowell et al. ................ 172/239 |
| 4,528,920 A | 7/1985 | Neumeyer ...................... 111/85 |
| 4,530,405 A | 7/1985 | White ........................... 172/126 |
| 4,537,262 A | 8/1985 | van der Lely ................. 172/146 |
| 4,538,688 A | 9/1985 | Szucs et al. .................. 172/555 |
| 4,550,122 A | 10/1985 | David et al. .................. 172/158 |
| 4,553,607 A | 11/1985 | Behn et al. ................... 172/156 |
| 4,580,506 A | 4/1986 | Fleischer et al. ............... 111/7 |
| 4,596,200 A | 6/1986 | Gafford et al. ................. 111/85 |
| 4,603,746 A | 8/1986 | Swales .......................... 172/559 |
| 4,604,906 A | 8/1986 | Scarpa ....................... 73/861.74 |
| 4,630,773 A | 12/1986 | Ortlip ............................... 239/1 |
| 4,643,043 A | 2/1987 | Furuta et al. ................... 74/503 |
| 4,646,620 A | 3/1987 | Buchl ............................... 91/1 |
| 4,650,005 A | 3/1987 | Tebben ........................ 172/430 |
| 4,669,550 A | 6/1987 | Sittre ............................ 172/559 |
| 4,671,193 A | 6/1987 | States ............................. 111/73 |
| 4,674,578 A | 6/1987 | Bexten et al. ................. 172/126 |
| 4,703,809 A | 11/1987 | Van den Ende ............... 172/147 |
| 4,726,304 A | 2/1988 | Dreyer et al. ................... 111/73 |
| 4,738,461 A | 4/1988 | Stephenson et al. .......... 280/400 |
| 4,744,316 A | 5/1988 | Lienemann et al. ............. 111/69 |
| 4,762,075 A | 8/1988 | Halford .......................... 111/73 |
| 4,765,190 A | 8/1988 | Strubbe ...................... 73/861.72 |
| 4,768,387 A | 9/1988 | Kemp et al. ................ 73/861.73 |
| 4,779,684 A | 10/1988 | Schultz .......................... 171/62 |
| 4,785,890 A | 11/1988 | Martin ............................ 172/29 |
| 4,825,957 A | 5/1989 | White et al. ................... 172/126 |
| 4,825,959 A | 5/1989 | Wilhelm ....................... 172/720 |
| 4,920,901 A | 5/1990 | Pounds ......................... 111/164 |
| 4,926,767 A | 5/1990 | Thomas ........................ 111/187 |
| 4,930,431 A | 6/1990 | Alexander .................... 111/164 |
| 4,986,367 A | 1/1991 | Kinzenbaw ................... 172/126 |
| 4,998,488 A | 3/1991 | Hansson ....................... 111/187 |
| 5,015,997 A | 5/1991 | Strubbe ......................... 340/684 |
| 5,027,525 A | 7/1991 | Haukaas ......................... 33/624 |
| 5,033,397 A | 7/1991 | Colburn, Jr. .................. 111/118 |
| 5,065,632 A | 11/1991 | Reuter ....................... 73/861.73 |
| 5,074,227 A | 12/1991 | Schwitters |
| 5,076,180 A | 12/1991 | Schneider .................... 111/139 |
| 5,092,255 A | 3/1992 | Long et al. .................... 111/167 |
| 5,113,957 A | 5/1992 | Tamai et al. .................... 172/10 |
| 5,129,282 A | 7/1992 | Bassett et al. .................. 74/529 |
| 5,136,934 A | 8/1992 | Darby, Jr. ...................... 100/125 |
| 5,190,112 A | 3/1993 | Johnston et al. ............. 172/245 |
| 5,234,060 A | 8/1993 | Carter .......................... 172/413 |
| 5,240,080 A | 8/1993 | Bassett et al. ................ 172/740 |
| 5,255,617 A | 10/1993 | Williams et al. .............. 111/140 |
| 5,269,237 A | 12/1993 | Baker et al. .................. 111/121 |
| 5,282,389 A | 2/1994 | Faivre et al. ............... 73/861.73 |

(56) References Cited

U.S. PATENT DOCUMENTS

| | | | |
|---|---|---|---|
| 5,285,854 A | 2/1994 | Thacker et al. | 172/176 |
| 5,333,694 A | 8/1994 | Roggenbuck et al. | 172/156 |
| 5,337,832 A | 8/1994 | Bassett | 172/504 |
| 5,341,754 A | 8/1994 | Winterton | 111/139 |
| 5,346,019 A | 9/1994 | Kinzenbaw et al. | 172/311 |
| 5,346,020 A | 9/1994 | Bassett | 172/540 |
| 5,349,911 A | 9/1994 | Holst et al. | 111/139 |
| 5,351,635 A | 10/1994 | Hulicsko | 111/135 |
| 5,379,847 A | 1/1995 | Snyder | 172/128 |
| 5,394,946 A | 3/1995 | Clifton et al. | 172/139 |
| 5,398,771 A | 3/1995 | Hornung et al. | 172/311 |
| 5,419,402 A | 5/1995 | Heintzman | 172/551 |
| 5,427,192 A | 6/1995 | Stephenson et al. | 180/53.1 |
| 5,443,023 A | 8/1995 | Carroll | 111/191 |
| 5,443,125 A | 8/1995 | Clark et al. | 172/608 |
| 5,461,995 A | 10/1995 | Winterton | 111/139 |
| 5,462,124 A | 10/1995 | Rawson | 172/569 |
| 5,473,999 A | 12/1995 | Rawson et al. | 111/127 |
| 5,477,682 A * | 12/1995 | Tobiasz | 60/583 |
| 5,477,792 A | 12/1995 | Bassett et al. | 111/121 |
| 5,479,868 A | 1/1996 | Bassett | 111/139 |
| 5,479,992 A | 1/1996 | Bassett | 172/4 |
| 5,485,796 A | 1/1996 | Bassett | 111/33 |
| 5,485,886 A | 1/1996 | Bassett | 172/763 |
| 5,497,717 A | 3/1996 | Martin | 111/191 |
| 5,497,837 A | 3/1996 | Kehrney | 172/619 |
| 5,499,683 A | 3/1996 | Bassett | 172/4 |
| 5,499,685 A | 3/1996 | Downing, Jr. | 172/699 |
| 5,517,932 A | 5/1996 | Ott et al. | 111/193 |
| 5,531,171 A | 7/1996 | Whitesel et al. | 111/121 |
| 5,542,362 A | 8/1996 | Bassett | 111/120 |
| 5,544,709 A | 8/1996 | Lowe et al. | 172/661 |
| 5,562,165 A | 10/1996 | Janelle et al. | 172/4 |
| 5,590,611 A | 1/1997 | Smith | 111/127 |
| 5,603,269 A | 2/1997 | Bassett | 111/52 |
| 5,623,997 A | 4/1997 | Rawson et al. | 172/156 |
| 5,640,914 A | 6/1997 | Rawson | 111/140 |
| 5,657,707 A | 8/1997 | Dresher et al. | 111/139 |
| 5,660,126 A | 8/1997 | Freed et al. | 111/140 |
| 5,685,245 A | 11/1997 | Bassett | 111/62 |
| 5,704,430 A | 1/1998 | Smith et al. | 172/29 |
| 5,709,271 A * | 1/1998 | Bassett | 172/4 |
| 5,727,638 A | 3/1998 | Wodrich et al. | 172/414 |
| 5,852,982 A | 12/1998 | Peter | 111/118 |
| 5,868,207 A | 2/1999 | Langbakk et al. | 172/274 |
| 5,878,678 A | 3/1999 | Stephens et al. | 111/139 |
| RE36,243 E | 7/1999 | Rawson et al. | 111/121 |
| 5,970,891 A | 10/1999 | Schlagel | 111/135 |
| 5,970,892 A | 10/1999 | Wendling et al. | 111/139 |
| 5,988,293 A | 11/1999 | Brueggen et al. | 172/414 |
| 6,067,918 A | 5/2000 | Kirby | 111/121 |
| 6,164,385 A | 12/2000 | Buchl | 172/239 |
| 6,223,663 B1 | 5/2001 | Wendling et al. | 111/139 |
| 6,223,828 B1 | 5/2001 | Paulson et al. | 171/63 |
| 6,237,696 B1 | 5/2001 | Mayerle | 172/558 |
| 6,253,692 B1 | 7/2001 | Wendling et al. | 111/139 |
| 6,314,897 B1 | 11/2001 | Hagny | 111/192 |
| 6,325,156 B1 | 12/2001 | Barry | 172/518 |
| 6,330,922 B1 | 12/2001 | King | 172/166 |
| 6,331,142 B1 | 12/2001 | Bischoff | 460/112 |
| 6,343,661 B1 | 2/2002 | Thompson et al. | 172/444 |
| 6,347,594 B1 | 2/2002 | Wendling et al. | 111/167 |
| 6,382,326 B1 | 5/2002 | Goins et al. | 172/239 |
| 6,389,999 B1 | 5/2002 | Duello | 111/200 |
| 6,453,832 B1 | 9/2002 | Schaffert | 111/150 |
| 6,454,019 B1 | 9/2002 | Prairie et al. | 172/677 |
| 6,460,623 B1 | 10/2002 | Knussman et al. | 172/4 |
| 6,516,595 B2 | 2/2003 | Rhody et al. | 56/10.2 E |
| 6,530,334 B2 | 3/2003 | Hagny | 111/189 |
| 6,575,104 B2 | 6/2003 | Brummelhuis | 111/139 |
| 6,644,224 B1 | 11/2003 | Bassett | 111/157 |
| 6,701,856 B1 | 3/2004 | Zoke et al. | 111/121 |
| 6,701,857 B1 | 3/2004 | Jensen et al. | 111/200 |
| 6,786,130 B2 | 9/2004 | Steinlage et al. | 91/390 |
| 6,834,598 B2 | 12/2004 | Jüptner | 111/140 |
| 6,840,853 B2 | 1/2005 | Foth | 460/111 |
| 6,889,943 B2 | 5/2005 | Dinh et al. | 248/34 |
| 6,912,963 B2 | 7/2005 | Bassett | 111/163 |
| 6,986,313 B2 | 1/2006 | Halford et al. | 111/186 |
| 6,997,400 B1 | 2/2006 | Hanna et al. | 239/383 |
| 7,004,090 B2 | 2/2006 | Swanson | 111/119 |
| 7,044,070 B2 | 5/2006 | Kaster et al. | 111/62 |
| 7,063,167 B1 | 6/2006 | Staszak et al. | 172/328 |
| 7,159,523 B2 | 1/2007 | Bourgault et al. | 111/187 |
| 7,222,575 B2 | 5/2007 | Bassett | 111/140 |
| 7,290,491 B2 | 11/2007 | Summach et al. | 111/181 |
| 7,360,494 B2 | 4/2008 | Martin | 111/164 |
| 7,360,495 B1 | 4/2008 | Martin | 111/164 |
| 7,438,006 B2 | 10/2008 | Mariman et al. | 111/164 |
| 7,451,712 B2 | 11/2008 | Bassett et al. | 111/140 |
| 7,523,709 B1 | 4/2009 | Kiest | 111/119 |
| 7,540,333 B2 | 6/2009 | Bettin et al. | 172/744 |
| 7,575,066 B2 | 8/2009 | Bauer | 172/540 |
| 7,584,707 B2 | 9/2009 | Sauder et al. | 111/140 |
| 7,665,539 B2 | 2/2010 | Bassett et al. | 172/540 |
| 7,673,570 B1 * | 3/2010 | Bassett | 111/63 |
| 7,743,718 B2 | 6/2010 | Bassett | 111/135 |
| 7,870,827 B2 | 1/2011 | Bassett | 111/119 |
| 7,946,231 B2 * | 5/2011 | Martin et al. | 111/60 |
| 8,146,519 B2 | 4/2012 | Bassett | 111/119 |
| 8,151,717 B2 | 4/2012 | Bassett | 111/135 |
| 8,327,780 B2 * | 12/2012 | Bassett | 111/119 |
| 8,380,356 B1 | 2/2013 | Zielke et al. | 700/284 |
| 8,386,137 B2 | 2/2013 | Sauder et al. | 701/50 |
| 8,393,407 B2 | 3/2013 | Freed | 172/551 |
| 8,408,149 B2 * | 4/2013 | Rylander | 111/140 |
| 2002/0162492 A1 | 11/2002 | Juptner | 111/140 |
| 2006/0102058 A1 | 5/2006 | Swanson | 111/119 |
| 2006/0191695 A1 | 8/2006 | Walker et al. | 172/452 |
| 2006/0237203 A1 | 10/2006 | Miskin | 172/799.5 |
| 2007/0044694 A1 | 3/2007 | Martin | 111/121 |
| 2008/0093093 A1 | 4/2008 | Sheppard et al. | 172/2 |
| 2008/0236461 A1 | 10/2008 | Sauder et al. | 111/170 |
| 2008/0256916 A1 * | 10/2008 | Vaske et al. | 56/13.5 |
| 2010/0019471 A1 | 1/2010 | Ruckle et al. | 280/504 |
| 2010/0108336 A1 | 5/2010 | Thomson et al. | 172/795 |
| 2010/0180695 A1 | 7/2010 | Sauder et al. | 73/862.045 |
| 2010/0198529 A1 | 8/2010 | Sauder et al. | 702/41 |
| 2010/0282480 A1 | 11/2010 | Breker et al. | 172/170 |
| 2011/0036602 A1 | 2/2011 | Bassett | 172/1 |
| 2011/0088603 A1 | 4/2011 | Bassett | 111/121 |
| 2011/0247537 A1 | 10/2011 | Freed | 111/140 |
| 2011/0313575 A1 | 12/2011 | Kowalchuk et al. | 700/282 |
| 2012/0060730 A1 * | 3/2012 | Bassett | 111/149 |
| 2012/0060731 A1 | 3/2012 | Bassett | 111/149 |
| 2012/0186216 A1 * | 7/2012 | Vaske et al. | 56/367 |
| 2012/0216731 A1 | 8/2012 | Schilling et al. | 111/69 |
| 2012/0255475 A1 | 10/2012 | Mariman et al. | 111/149 |
| 2013/0032363 A1 | 2/2013 | Curry et al. | 172/4 |
| 2013/0112121 A1 | 5/2013 | Achen et al. | 111/14 |
| 2013/0112124 A1 | 5/2013 | Bergen et al. | 111/151 |

FOREIGN PATENT DOCUMENTS

| | | | |
|---|---|---|---|
| DE | 335464 | 9/1921 | |
| DE | 1108971 | 6/1961 | |
| DE | 24 02 411 | 7/1975 | |
| GB | 1 574 412 | 9/1980 | 111/123 |
| GB | 2 056 238 A | 10/1982 | |
| JP | 54-57726 | 5/1979 | 74/529 |
| SU | 392897 | 8/1973 | |
| SU | 436778 | 7/1974 | |
| SU | 611201 | 6/1978 | 74/527 |
| SU | 625648 | 9/1978 | |
| SU | 1410884 A1 | 7/1988 | |
| SU | 1466674 | 3/1989 | 111/124 |
| WO | WO 2012/167244 A1 | 12/2012 | A01B 5/00 |

OTHER PUBLICATIONS

Buffalo Farm Equipment All Flex Cultivator Operator Manual, Apr. 1990 (7 pages).

Shivvers, Moisture Trac 3000 Brochure, Aug. 21, 1990 (5 pages).

(56) References Cited

OTHER PUBLICATIONS

The New Farm, "*New Efficiencies in Nitrogen Application*," Feb. 1991, p. 6 (1 page).
Hiniker Company, Flow & Acreage Continuous Tracking System Monitor Demonstration Manuel, date estimated as early as Feb. 1991 (7 pages).
Russnogle, John, "*Sky Spy: Gulf War Technology Pinpoints Field and Yields*," Top Producer, A Farm Journal Publication, Nov. 1991, pp. 12-14 (4 pages).
Borgelt, Steven C., "*Sensor Technologies and Control Strategies for Managing Variability*," University of Missouri, Apr. 14-16, 1992 (15 pages).
Buffalo Farm Equipment Catalog on Models 4600, 4630, 4640, and 4620, date estimated as early as Feb. 1992 (4 pages ).
Hiniker 5000 Cultivator Brochure, date estimated as early as Feb. 1992 (4 pages).
Hiniker Series 5000 Row Cultivator Rigid and Folding Toolbar Operator's Manual, date estimated as early as Feb. 1992 (5 pages).
Orthman Manufacturing, Inc., Rowcrop Cultivator Booklet, date estimated as early as Feb. 1992 (4 pages).
Yetter Catalog, date estimated as early as Feb. 1992 (4 pages).
Finck, Charlene, "*Listen to Your Soil*," Farm Journal Article, Jan. 1993, pp. 14-15 (2 pages).
Acu-Grain, "*Combine Yield Monitor 99% Accurate? 'You Bet Your Bushels*!!'" date estimated as early as Feb. 1993 (2 pages).
John Deere, New 4435 Hydro Row-Crop and Small-Grain Combine, date estimated as early as Feb. 1993 (8 pages).
Vansichen, R. et al., "*Continuous Wheat Yield Measurement On A Combine*," date estimated as early as Feb. 1993 (5 pages).
Martin Industries, LLC Paired 13 Spading Closing Wheels Brochure, date estimated as early as Jun. 6, 2012, pp. 18-25 (8 pages).
Exner, Rick, "*Sustainable Agriculture: Practical Farmers of Iowa Reducing Weed Pressure in Ridge-Till*," Iowa State University University Extension, http://www.extension.iastate.edu/Publications/SA2.pdf, Jul. 1992, Reviewed Jul. 2009, Retrieved Nov. 2, 2012 (4 pages).
Yetter 2010 Product Catalog, date estimated as early as Jan. 2010 (2 pp.).
Yetter Cut and Move Manual, Sep. 2010 (28 pp.).

\* cited by examiner

AGRICULTURAL TOOL WITH STRUCTURAL HOUSING FOR HYDRAULIC ACTUATOR

FIELD OF THE INVENTION

The present invention relates generally to agricultural equipment and, more particularly, to a floating support linkage for an agricultural tool having an adjustable hydraulic down pressure and a support structure integrally forming a housing for a hydraulic actuator.

BACKGROUND OF THE INVENTION

In agricultural applications, agricultural devices utilize tools to prepare the soil for farming. For example, the tools include cutting wheels for forming furrows prior to planting of seeds. The tools are subjected to physical forces caused by contact with the soil and are exposed to environmental contaminants, including dust and dirt. The forces imparted by the soil vary with the soil conditions, which are dependent on terrain and weather conditions.

In turn, the forces imparted on the tools are further received by other components of the agricultural devices, including hydraulic, pneumatic, or mechanical actuators. The actuators and their components (e.g., hydraulic hoses, glands, seals) are typically mounted on the agricultural devices such that they are at least partially exposed to the environment. The exposure causes many problems, including unsafe working conditions for operators, reducing strength of support linkages against the soil-imparted forces, increased wear on components from crop material, reduced life of components, etc.

SUMMARY OF THE INVENTION

In accordance with one embodiment, an agricultural row unit has a support frame, a structural support housing coupled to the support frame, and a swing arm having a leading end pivotably coupled to the structural support housing. An agricultural tool is coupled to a trailing end of the swing arm, and a hydraulic actuator is mounted to and fully enclosed within the structural support housing. The structural support housing bears forces imparted on the agricultural tool by a soil surface. The hydraulic actuator adjustably urges the agricultural tool downwardly toward the soil surface such that vertical pivoting movement is permitted in response to terrain changes in the soil surface.

In accordance with another embodiment, an agricultural row unit is used with a towing frame hitched to a tractor. The agricultural row unit includes a support frame for attachment to the towing frame, and a structural support housing coupled to a leading end of the support frame. The structural support housing provides structural support for a hydraulic actuator mounted within. A swing arm has a pivoting end coupled to a leading end of the structural support housing, and a trailing end attached to a coulter wheel for opening a furrow in a soil surface. The hydraulic actuator causes the coulter wheel to float over a change in the soil surface by adjusting vertically in response to the change.

In accordance with another embodiment, an agricultural row unit is used with a towing frame hitched to a tractor. The agricultural row unit includes a support frame, a structural support housing coupled to a leading side of the support frame, and a swing arm having a leading end pivotably coupled to a leading end of the structural support housing. A cutting wheel is coupled to a trailing end of the swing arm for forming a furrow in a soil surface. A hydraulic actuator is mounted within the structural support housing and includes a ram extending into a hydraulic-fluid cavity within a hydraulic cylinder. The hydraulic-fluid cavity receives pressurized hydraulic fluid for advancing the hydraulic cylinder in a first direction that pivots the swing arm downwardly toward the soil surface. An energy storage device is positioned adjacent to the hydraulic actuator within the structural support housing, the energy storage device urging the hydraulic cylinder in a second direction that pivots the swing arm upward away from the soil surface.

According to one example, the energy storage device is an accumulator, which is joined to the hydraulic cylinder and to a hydraulic hose via a pivot support, and the hydraulic actuator includes a hydraulic ram with an axial fluid passageway. The pivot support acts as a manifold to join the hydraulic cylinder, the hydraulic hose, and the accumulator. The pivot support provide both a mechanical connection and a fluid connection for the hydraulic cylinder, the hydraulic hose, and the accumulator

BRIEF DESCRIPTION OF THE DRAWINGS

The invention may best be understood by reference to the following description taken in conjunction with the accompanying drawings, in which.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
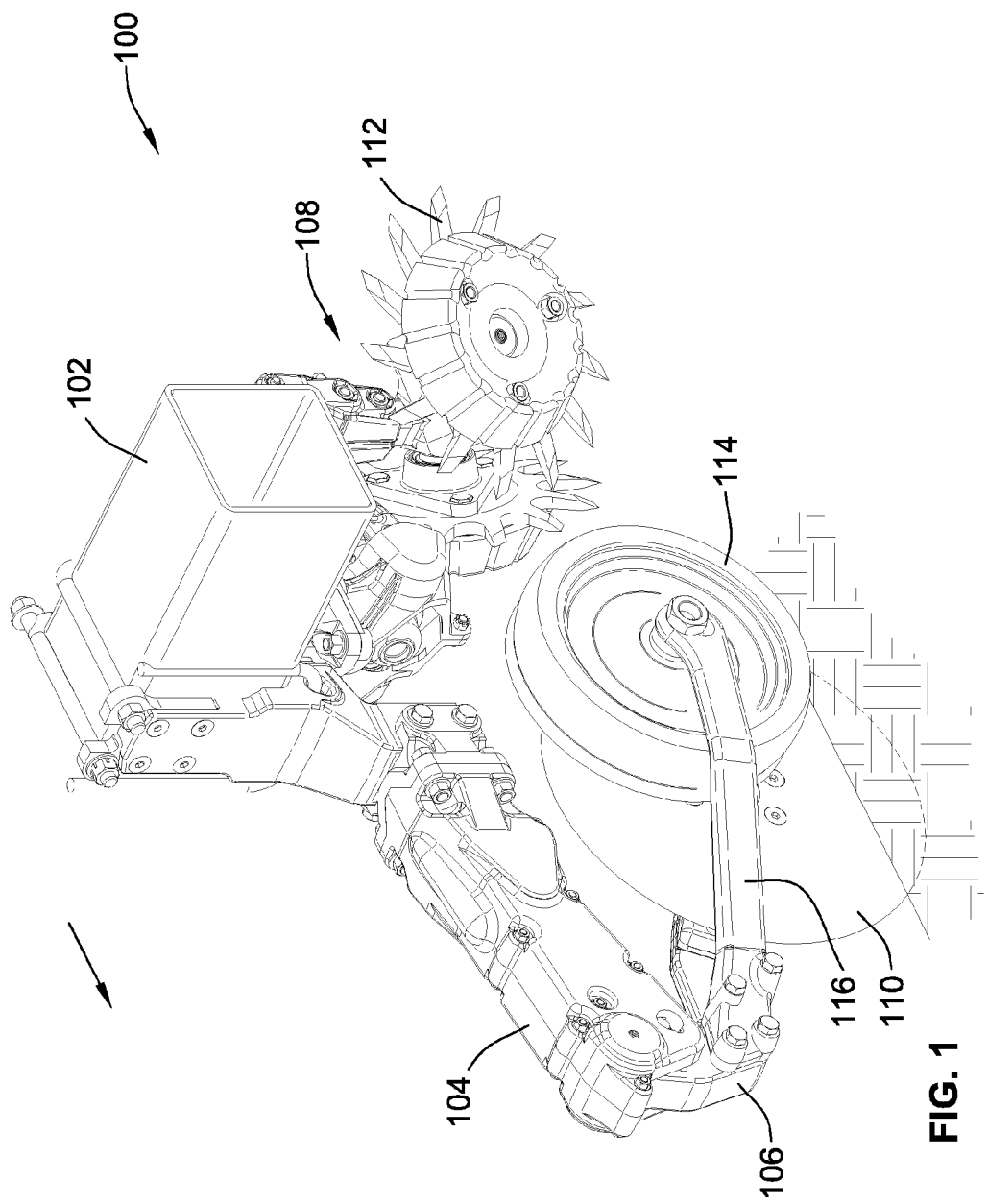
FIG. 1 is a perspective view of an agricultural row unit.

Turning now to the drawings and referring first to FIG. 1, an agricultural row unit 100 for biasing agricultural tools against a soil surface includes a support frame 102, a structural support housing 104, a swing arm 106, and a trailing floating linkage 108. The tools can include, for example, a cutting wheel (e.g., a coulter wheel) 110, which penetrates the soil to form a furrow or seed slot in preparation for a planting operation.

The trailing floating linkage 108 is in the form of a row cleaner with a pair of toothed wheels 112 for removing crop residue away from the furrow. Other portions of the row unit 100 or of other agricultural devices then deposit seed in the seed slot and fertilizer adjacent to the seed slot, and close the seed slot by distributing loosened soil into the seed slot with a pair of closing wheels. Optionally, the toothed wheels 112 can be replaced on the trailing floating linkage 108 with a single or double closing wheel.

The row unit 100 further includes a gauge wheel 114 attached to the swing arm 106 via a gauge wheel arm 116. The gauge wheel 114 determines the furrow depth, based on, for example, the desired planting depth for the seed and the height of introduction of fertilizer.

Figure 2:
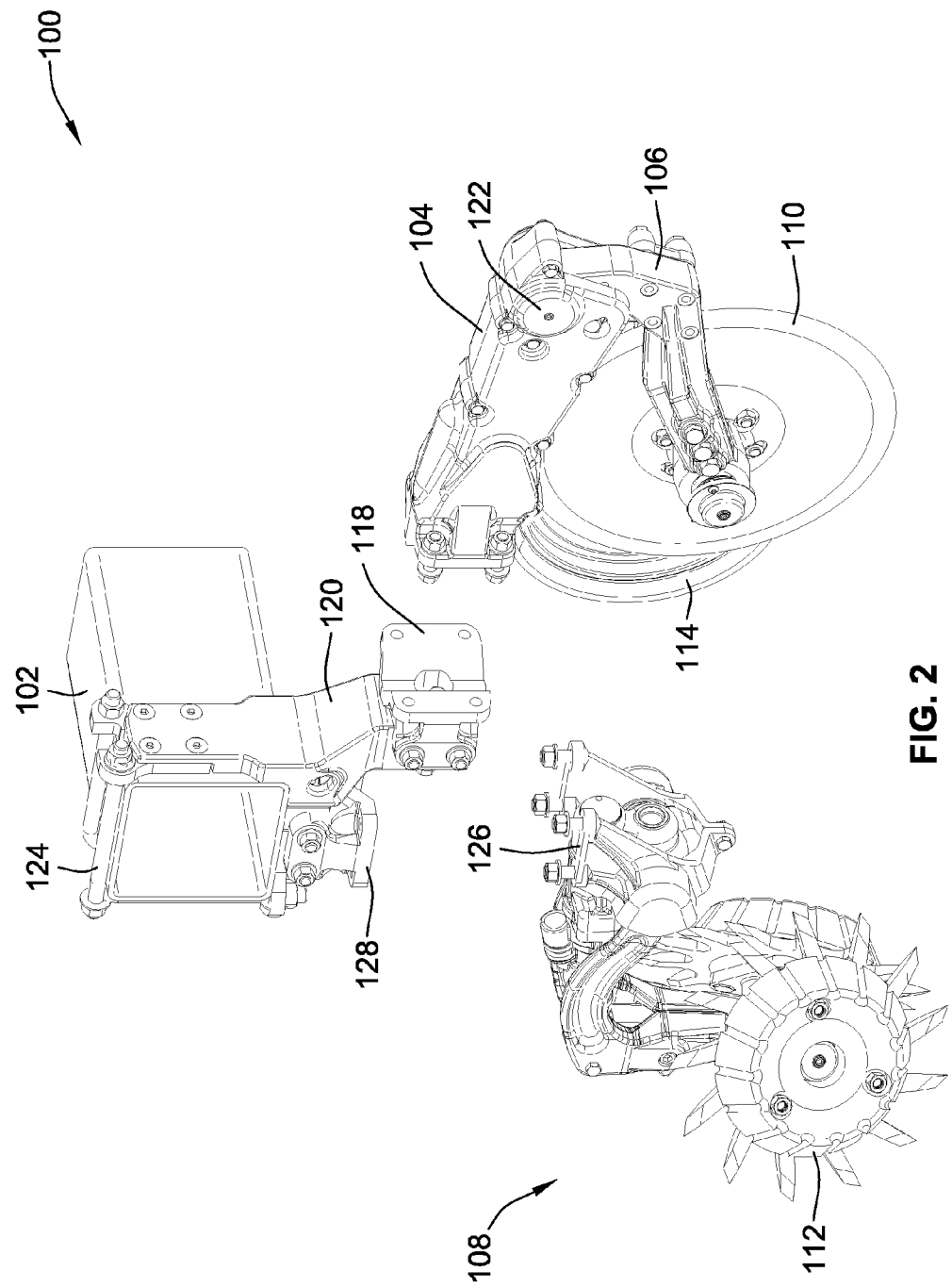
FIG. 2 is an exploded view of the agricultural row unit of FIG. 1.

Referring to FIG. 2, a trailing end of the structural support housing 104 is attached to a leading end of the support frame 102 via a leading mounting spacer 118, which is mounted to a primary mounting bracket 120. A leading end of the structural support housing 104 is attached to a leading end of the swing arm 106 at a swing-arm pivot 122. The cutting wheel 110 is attached to a trailing end of the swing arm 106.

The support frame 102 includes a plurality of frame attachment bolts 124 for attaching the support frame 102, for example, to a towing frame hitched to a tractor. The trailing floating linkage 108 is attached to a secondary mounting bracket 126, which is attached to the support frame 102 via a trailing mounting spacer 128.

Figure 3:
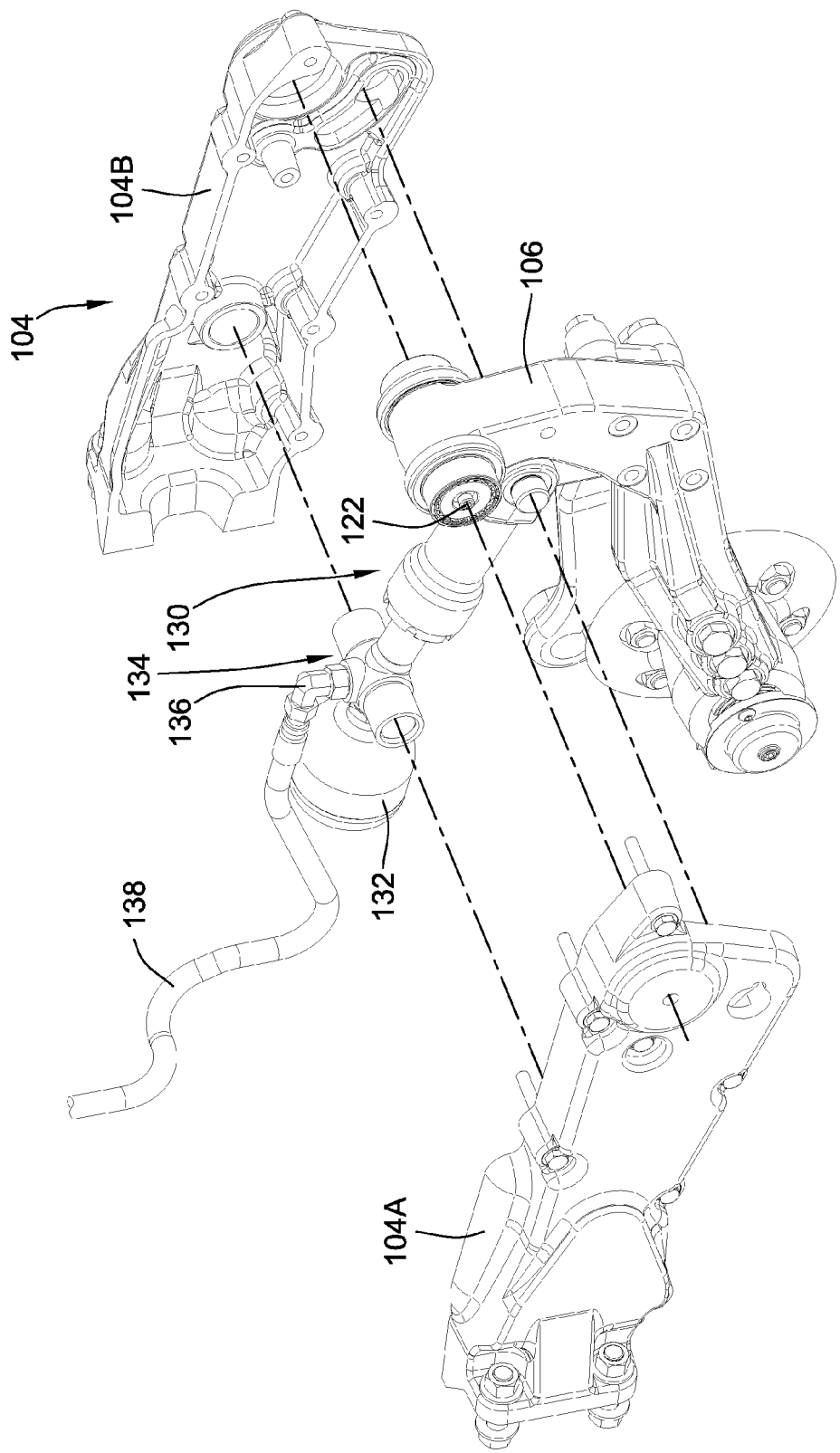
FIG. 3 is an exploded view of a structural support housing of the agricultural row unit of FIG. 1.

Referring to FIG. 3, the structural support housing 104 has a left housing 104A and a right housing 104B for structurally supporting and fully enclosing a hydraulic actuator 130 and an accumulator 132. The hydraulic actuator 130 includes a pivot support 134 for connecting to the accumulator 132. The pivot support 134 includes a perpendicular port 136 for coupling to a hydraulic hose 138, which is routed within the structural support housing 104. The routing of the hydraulic hose 138 within the structural support housing 104 eliminates or reduces hose wear from environmental conditions, including wear from crop material.

Figure 4:
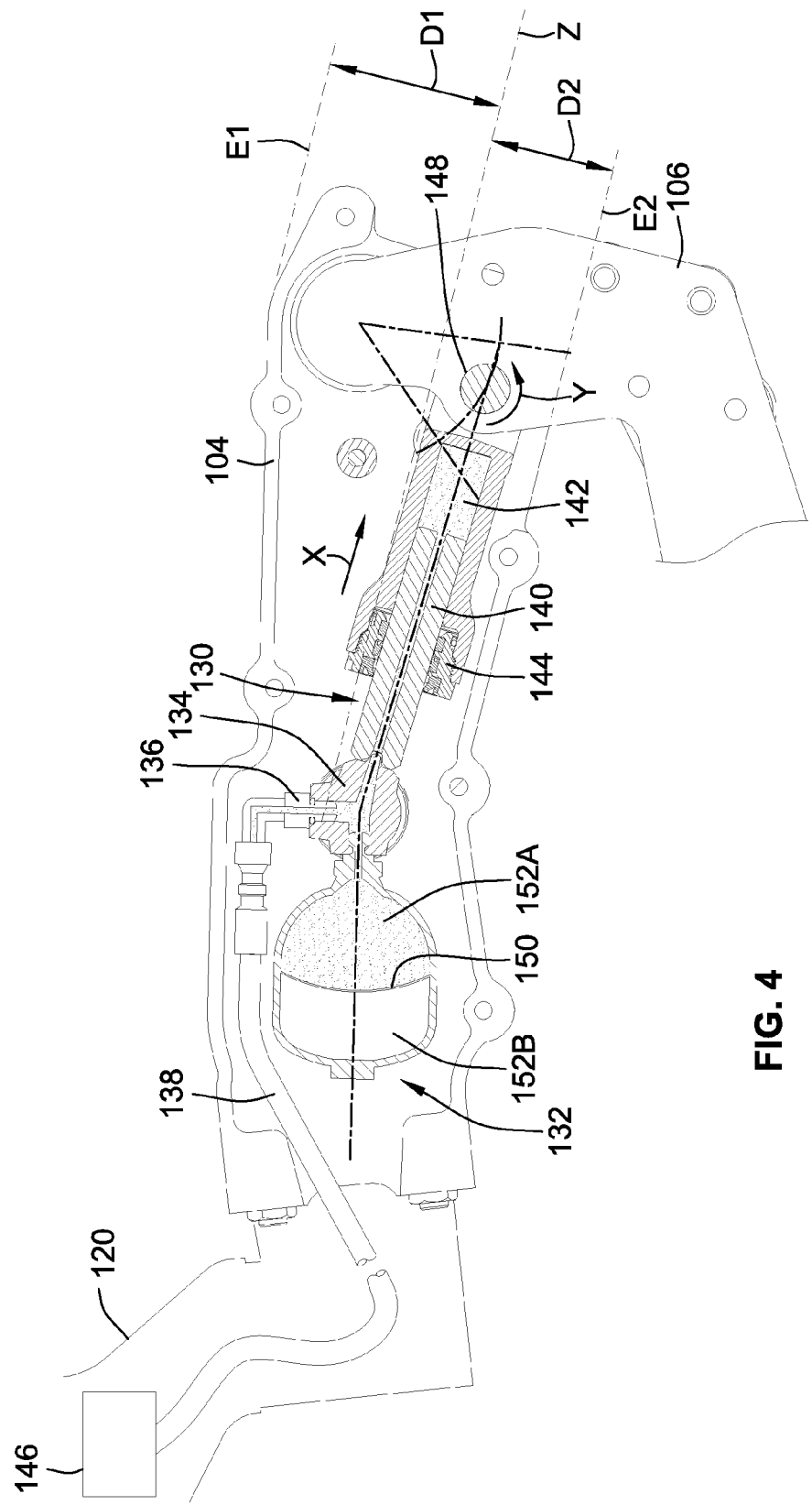
FIG. 4 is a cross-sectional illustration of the structural support housing of FIG. 3.

Referring to FIG. 4, the hydraulic actuator 130 further includes a hydraulic ram 140 with an axial fluid passageway, a hydraulic cylinder 142, and a hydraulic gland with seals and wear ring 144. The hydraulic hose 138 is connected to a variable pressure control circuit 146 in the primary mounting bracket 120 and receives hydraulic fluid, typically, from a tractor. The hydraulic fluid is supplied into an internal chamber of the pivot support 134 and through the axial passageway of the hydraulic ram 140. Hydraulic pressure exerted by the hydraulic fluid through the axial passageway of the hydraulic ram 140 urges the hydraulic cylinder 142 downwardly in an advancing direction X, with a force determined by the pressure of the hydraulic fluid and the area of an internal end surface of the hydraulic cylinder 142. The hydraulic fluid, thus, urges the hydraulic cylinder 142 in an advancing direction relative to the hydraulic ram 140.

As the hydraulic cylinder 142 moves downwardly in the advancing direction X, the swing arm 106 pivots in a counterclockwise direction Y around a pivot pin 148, which couples a lower end of the hydraulic actuator 130 to the swing arm 106. The counterclockwise direction Y forces the swing arm 106 downwardly towards the soil surface, causing the cutting wheel 110 to be biased against the soil. However, by using the accumulator 132, the cutting wheel 110 is biased against the soil with an adjustable force that allows the cutting wheel 110 to float over a changing soil surface.

As the hydraulic cylinder 142 moves upwardly in a retracting direction, which is opposite to the advancing direction X, the swing arm 106 pivots in a clockwise direction (opposite to the counterclockwise direction Y) around the pivot pin 148. The clockwise direction forces the swing arm 106 upwardly away from the soil surface, causing the cutting wheel 110 to float over changes in the soil surface. In other words, the cutting wheel 110 can quickly adjust as it moves over rocks or other obstructions associated with terrain changes.

To facilitate the floating capability, the accumulator 132 includes a diaphragm 150 that divides the interior of the accumulator 132 into a hydraulic-fluid chamber 152A and a gas-filled chamber 152B, e.g., filled with pressurized nitrogen. When pressures exerted on opposite sides of the diaphragm 150 are substantially equal, the diaphragm 150 is not deflected in either direction. As shown in FIG. 4, however, when the hydraulic cylinder 142 moves upwardly in the retracting direction, hydraulic fluid is forced into the accumulator 132 and, consequently, the diaphragm 150 is deflected towards the gas-filled chamber 152B by the hydraulic fluid. When the hydraulic cylinder 142 moves downwardly in the advancing direction X, the diaphragm 150 is deflected towards the hydraulic-fluid chamber 152A by gas pressure as hydraulic fluid flows from the accumulator 132 into the internal chamber of the pivot support 134.

The use of the hydraulic actuator 130 with an accumulator 132 provides an agricultural implement suspension that is capable of quickly reacting to changing soil conditions. Specifically, this type of agricultural implement suspension allows an agricultural tool, such as the cutting wheel 110, to float over the changing soil surface. Furthermore, the enclosure of the hydraulic actuator 130 and accumulator 132 in the structural support housing 104 (a) protects operators from injury (e.g., prevents moving components from pinching an operator's hand), (b) prevents pinching crop material, (c) maximizes strength of the agricultural row unit 100 against forces imparted by the soil (based on the limited space available in the row unit), and (d) shields, at least in part, the hydraulic actuator 130 from environmental contaminants, including dust and dirt, helping to extend the life of the hydraulic gland and seals 144. As such, the integration of the hydraulic actuator 130 and accumulator 132 in the structural support housing 104 provides a very compact arrangement that generates high forces at high fluid pressures.

In reference to the strength of the agricultural row unit 100, the structural support housing 104 functions to both shield and structurally support the integrated arrangement of the hydraulic actuator 130 and accumulator 132. By integrating the hydraulic actuator 130 and accumulator 132 within an internal space of the structural support housing 104, outer edges E1, E2 are located at a respective distance D1, D2 away from a neutral bending axis Z of the structural support housing 104, which makes the structural support housing 104 more tube-like and resistant to torsional forces.

According to one example, the pivot support 134 is a perpendicular component that is welded to the hydraulic actuator 130 to function as a hydraulic union between the hydraulic hose 138, the hydraulic actuator 130, and the accumulator 132. The hydraulic hose 138 supplies the necessary pressure to the entire system, including the hydraulic cylinder 142 and the gas-charged accumulator 132. By packaging the accumulator 132 this way, and using the hydraulic ram 140 as a fluid passageway, it is possible to compress the components of the hydraulic actuator 130 into a very compact package. This compact package uses the available housing volume of the structural support housing 104 efficiently because the structural support housing 104 is designed to connect both the support frame 102 and the swing arm 106 in their respective positions, as dictated by industry norm.

Thus, in general, the axial fluid passageway of the hydraulic ram 140 allows the pivot support 134 to act as a manifold, joining (both mechanically and in fluid communication) the hydraulic cylinder 142, the hydraulic hose 138, and the accumulator 132. For example, hydraulic fluid is received into the pivot support 134 from the hydraulic hose 138. From the pivot support 134, hydraulic fluid flows through the axial passageway of the hydraulic ram 140 towards an internal hydraulic-fluid cavity of the hydraulic cylinder 142 (when the hydraulic cylinder 142 moves downwardly). Hydraulic fluid can also flow from the internal hydraulic-fluid cavity of the hydraulic cylinder 142 through the axial passageway of the hydraulic ram 140 towards the pivot support 134 and into the hydraulic-fluid chamber 152A of the accumulator 132.

Alternatively, the hydraulic actuator 130 is connected to another energy storage device in a way that allows the cutting wheel 110 to float over the changing soil surface. For example, instead of the accumulator 132, the hydraulic actuator 130 is connected to a mechanical spring enclosed within the structural support housing 104.

Figure 5:
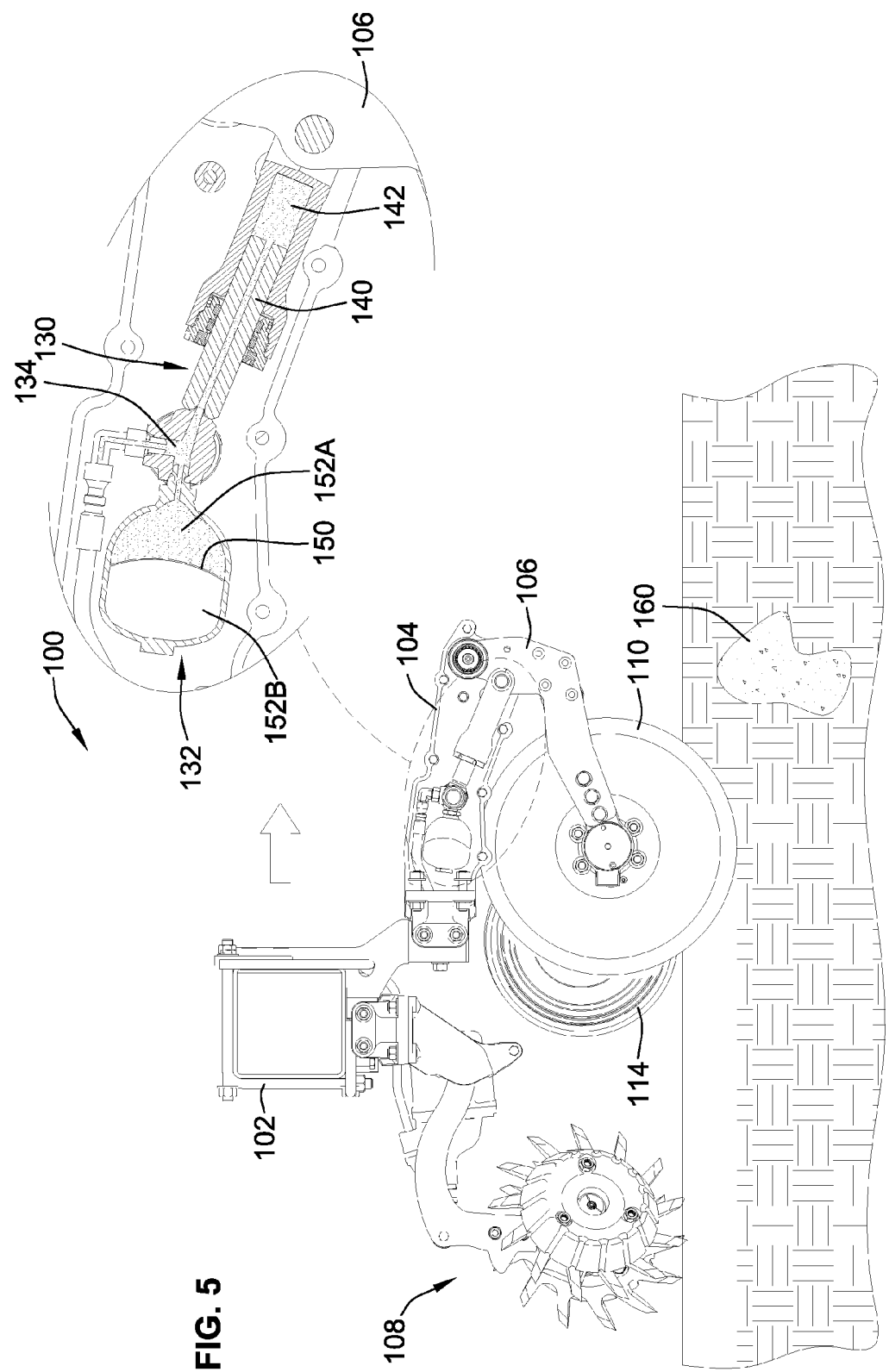
FIG. 5 is perspective view illustrating the agricultural row unit moving towards a rock.
Figure 6:
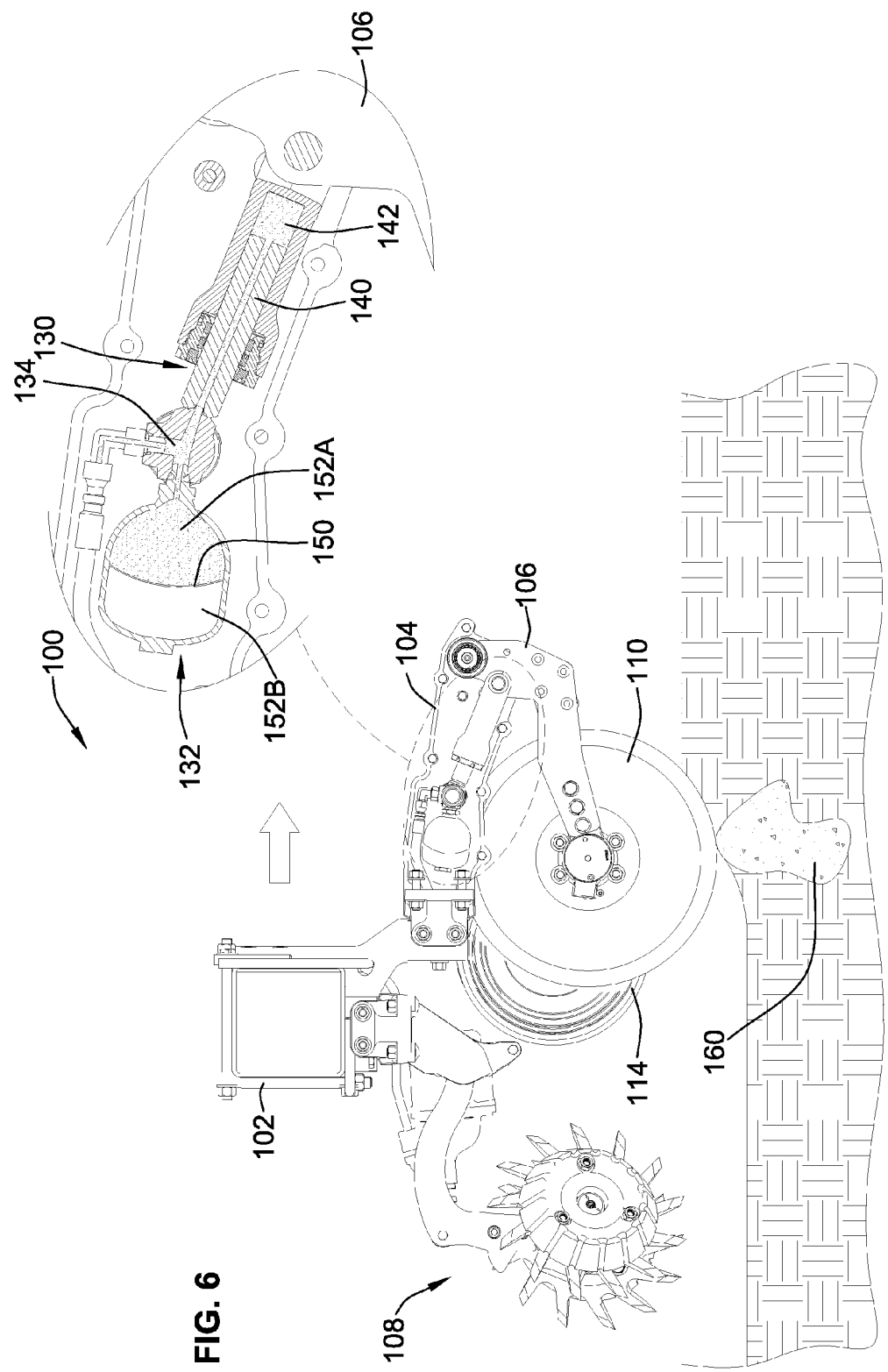
FIG. 6 is a perspective view illustrating the agricultural row unit making contact with the rock of FIG. 5

In reference to FIGS. 5 and 6, the floating motion of the agricultural row unit 100 is illustrated as the coulter wheel 110 floats over a rock 160. In FIG. 5, the row unit 100 is moving towards the rock 160 with the cutting wheel 110 cutting a furrow into the ground at an initial depth below the soil surface. In FIG. 6, the contact between the cutting wheel 110 and the rock 160 forces the cutting wheel 110 to float upwards over the rock 160. At this point, the cutting wheel 110 is at a smaller depth below the soil than the initial depth, and the hydraulic cylinder 142 is moved upwards to a retracted position. The retraction of the hydraulic cylinder 142 is caused by having a portion of the fixed volume of the hydraulic fluid (in hydraulic cylinder 142) flow into the hydraulic-fluid chamber 152A of the accumulator 132, causing the diaphragm 150 to deflect upwards, towards the gas-filled chamber 152B. To enter the hydraulic-fluid chamber 152A, the hydraulic fluid must flow through a port in the pivot support 134 at the bottom of the accumulator 132, which limits the rate at which the hydraulic fluid flows into the accumulator 132. This controlled rate of flow of the hydraulic fluid has a damping effect on the rate at which the hydraulic cylinder 142 retracts or advances, thereby avoiding sudden large movements of the moving parts of the row unit 100, including the cutting wheel 110.

When the rock 160 causing the row unit 100 to rise is cleared, the hydraulic cylinder 142 returns to a lower position, causing the cutting wheel 110 to return to the initial depth. The downward movement of the hydraulic cylinder 142 to the lower position is caused by the combined effects of the pressurized gas (in the gas-filled chamber 152B of the accumulator 132) on the diaphragm 150 and the pressure of the hydraulic fluid. This downward force on the cutting wheel 110 holds it in the soil and prevents uncontrolled bouncing of the cutting wheel 110 over irregular terrain. The downward force applied to the cutting wheel 110 can be adjusted by changing the pressure of the hydraulic fluid supplied to the hydraulic cylinder 142. As such, the interconnection and pivoting motions of the housing 104 and swing arm 106, together with the hydraulic suspension provided by the actuator 130 and the accumulator 132, allows the cutting wheel 110 to float over the soil surface even when obstructions are encountered.

It will be evident to those skilled in the art that the invention is not limited to the details of the foregoing illustrated embodiment and that the present invention may be embodied in other specific forms without departing from the spirit or essential attributes thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An agricultural row unit comprising:
   a support frame;
   a structural support housing coupled to the support frame, the structural support housing including separate left and right housing sections;
   a swing arm having a leading end pivotably coupled to the structural support housing;
   an agricultural tool coupled to a trailing end of the swing arm; and
   a hydraulic cylinder mounted to and enclosed within the left and right housing sections of the structural support housing, the left and right housing sections being attached to each other, the structural support housing bearing forces imparted on the agricultural tool by the soil surface, the hydraulic cylinder adjustably urging the agricultural tool downwardly toward a soil surface such that vertical pivoting movement is permitted in response to terrain changes in the soil surface.

2. The agricultural row unit of claim 1, further comprising:
   an accumulator positioned adjacent to the hydraulic cylinder within the structural support housing;
   a pivot support located within the structural support housing;
   a hydraulic hose routed within the structural support housing;
   wherein the hydraulic cylinder includes a hydraulic-fluid cavity, the hydraulic cylinder further including a hydraulic ram extending into the hydraulic-fluid cavity of the hydraulic cylinder, the hydraulic ram having an axial fluid passageway through which hydraulic fluid flows between the hydraulic-fluid cavity and the perpendicular pivot component;
   wherein the pivot support couples the hydraulic hose to the hydraulic ram and to the accumulator such that the hydraulic fluid flows between the hydraulic hose, the accumulator, and the hydraulic cylinder.

3. The agricultural row unit of claim 1, wherein the structural support housing is mounted to a leading side of the support frame via a bracket primary mounting bracket.

4. The agricultural row unit of claim 1, wherein the structural support housing is mounted to a mounting spacer, the mounting spacer being attached to a primary mounting bracket, the primary mounting bracket being attached to the support frame.

5. The agricultural row unit of claim 1, wherein the agricultural tool is a cutting wheel.

6. The agricultural row unit of claim 1, further comprising a trailing floating linkage mounted to the support frame, the trailing floating linkage having a row cleaner with one or more wheels selected from a group consisting of a closing wheel and a toothed wheel.

7. The agricultural row unit of claim 1, further comprising a gauge wheel mounted, via a gauge wheel arm, to a leading end of the swing arm.

8. The agricultural row unit of claim 1, wherein the hydraulic cylinder includes a ram extending into a hydraulic-fluid cavity within the hydraulic cylinder, the hydraulic-fluid cavity receiving pressurized hydraulic fluid for advancing the hydraulic cylinder in a first direction that pivots the swing arm downwardly toward the soil surface.

9. The agricultural row unit of claim 8, further comprising an accumulator positioned adjacent to the hydraulic cylinder within the structural support housing, the accumulator having a fluid chamber containing a pressurized gas for allowing the hydraulic cylinder to retract in a second direction that pivots the swing arm upward away from the soil surface.

10. The agricultural row unit of claim 8, further comprising a mechanical spring positioned adjacent to the hydraulic cylinder within the structural support housing, the mechanical spring biasing the hydraulic cylinder in a second direction that pivots the swing arm upward away from the soil surface.

11. The agricultural row unit of claim 1, wherein the swing arm is coupled to the a leading end of the structural support housing at a pivoting connection, the pivoting connection including a pivot bearing, a seal wear ring, and a grease seal.

12. The agricultural row unit of claim 1, further comprising a hydraulic hose routed within the structural support housing and coupled to the hydraulic cylinder.

13. An agricultural row unit for use with a towing frame hitched to a tractor, the row unit comprising:
   a support frame for attachment to the towing frame;
   a structural support housing coupled to a leading end of the support frame, the structural support housing including separate left and right housing sections, the structural support housing providing structural support for a hydraulic cylinder mounted within the left and right housing sections, the left and right housing sections being attached to each other; and
   a swing arm having a pivoting end coupled to a leading end of the structural support housing, the swing arm having a trailing end attached to a coulter wheel for opening a furrow in a soil surface, the hydraulic cylinder causing the coulter wheel to float over a change in the soil surface by adjusting vertically in response to the change.

14. The agricultural row unit of claim 13, further comprising:
   an accumulator enclosed within the structural support housing;
   a hydraulic hose for supplying hydraulic fluid and enclosed within the structural support housing; and
   a pivot support enclosed within the structural support housing and in fluid communication with the accumulator and the hydraulic hose;
   wherein the hydraulic cylinder includes a hydraulic-fluid cavity, the hydraulic cylinder further including a hydraulic ram having an axial fluid passageway in fluid communication with the pivot support and the hydraulic-fluid cavity of the hydraulic cylinder.

15. The agricultural row unit of claim 14, wherein the hydraulic-fluid cavity receives pressurized hydraulic fluid from the hydraulic hose, via the pivot support, for advancing the hydraulic cylinder in a first direction that pivots the swing arm downwardly toward the soil surface.

16. The agricultural row unit of claim 14, wherein the accumulator includes a fluid chamber containing a pressurized gas for allowing the hydraulic cylinder to retract in a second direction that pivots the swing arm upward away from the soil surface.

17. An agricultural row unit for use with a towing frame hitched to a tractor, the row unit comprising:
   a support frame;
   a structural support housing coupled to a leading side of the support frame, the structural support housing including separate left and right housing sections;
   a swing arm having a leading end pivotably coupled to a leading end of the structural support housing;
   a cutting wheel coupled to a trailing end of the swing arm for forming a furrow in a soil surface;
   a hydraulic cylinder mounted within the left and right housing sections of the structural support housing and including a ram extending into a hydraulic-fluid cavity within the hydraulic cylinder, the left and right housing sections being attached to each other, the hydraulic-fluid cavity receiving pressurized hydraulic fluid for advancing the hydraulic cylinder in a first direction that pivots the swing arm downwardly toward the soil surface; and
   an energy storage device positioned adjacent to the hydraulic cylinder within the structural support housing, the energy storage device allowing the hydraulic cylinder to move in a second direction that pivots the swing arm upward away from the soil surface.

18. The agricultural row unit of claim 17, wherein the energy storage device is selected from a group consisting of a mechanical spring and a gas-charged pressure vessel.

19. The agricultural row unit of claim 17, further comprising a hydraulic hose routed within the structural support housing and coupled to the hydraulic cylinder.

20. The agricultural row unit of claim 17, further comprising a trailing floating linkage mounted to the support frame, the trailing floating linkage having a row cleaner with one or more wheels selected from a group consisting of a closing wheel and a toothed wheel.

* * * * *